(12) United States Patent
Okada (10) Patent No.: US 7,652,968 B2
(45) Date of Patent: Jan. 26, 2010

(54) METHOD AND APPARATUS FOR RECORDING AND/OR REPRODUCING A HOLOGRAM

(75) Inventor: Hitoshi Okada, Chiba (JP)

(73) Assignee: Sony Corporation (JP)

( * ) Notice: Subject to any disclaimer, the term of this patent is extended or adjusted under 35 U.S.C. 154(b) by 759 days.

(21) Appl. No.: 11/300,925

(22) Filed: Dec. 15, 2005

(65) Prior Publication Data

US 2006/0164947 A1    Jul. 27, 2006

(30) Foreign Application Priority Data

Dec. 16, 2004  (JP) ................ P2004-364024

(51) Int. Cl.
*G11B 7/00* (2006.01)
(52) U.S. Cl. ..................................... 369/103
(58) Field of Classification Search .............. None
See application file for complete search history.

(56) References Cited

U.S. PATENT DOCUMENTS 5,592,313 A * 1/1997 Hart ........................... 359/24
5,812,296 A * 9/1998 Tarusawa et al. ........... 398/116
5,982,794 A * 11/1999 Tamura ...................... 372/29.012
6,438,147 B1 * 8/2002 Roychoudhuri et al. ..... 372/20
6,504,856 B1 * 1/2003 Broberg et al. ............. 372/38.07
6,807,204 B1 * 10/2004 O'Dowd ..................... 372/32

FOREIGN PATENT DOCUMENTS

JP      2001-284715 A      10/2001

* cited by examiner

*Primary Examiner*—Joseph H Feild
*Assistant Examiner*—Christopher R. Lamb
(74) *Attorney, Agent, or Firm*—Lerner, David, Littenberg, Krumholz & Mentlik, LLP (57) ABSTRACT

A holographic recording/reproducing apparatus is adapted to split laser light into signal light and reference light and to record a hologram by illuminating a holographic recording medium with the signal light and the reference light and/or to reproduce the hologram by illuminating the holographic recording medium with the reference light. The holographic recording/reproducing apparatus includes a laser light source that emits the laser light, a measuring unit operable to measure the wavelength of the laser light, and a setting unit operable to measure the wavelength of the laser light while changing a current supplied to the laser light source, and to set the current supplied to the laser light source based on a measurement result such that the influence of a change in the wavelength of the laser light is minimized.

10 Claims, 9 Drawing Sheets

METHOD AND APPARATUS FOR RECORDING AND/OR REPRODUCING A HOLOGRAM

CROSS-REFERENCE TO RELATED APPLICATIONS

The present application claims priority from Japanese Patent Application No. JP 2004-364024 filed on Dec. 16, 2004, the disclosure of which is hereby incorporated by reference herein.

BACKGROUND OF THE INVENTION

The present invention relates to a method and apparatus for recording and/or reproducing a hologram.

Efforts are being made to develop a holographic recording/reproducing apparatus for recording/reproducing data using a hologram.

In the holographic recording/reproducing apparatus, modulated signal light (on which data is superimposed) and non-modulated reference light are produced from laser light and a holographic recording medium is illuminated such that the signal light and the reference light strike the same point on the holographic recording medium. On the holographic recording medium, the signal light and the reference light interfere with each other and, as a result of the interference, a diffraction grating (a hologram) is formed on the holographic recording medium and data is recorded on the holographic recording medium.

After data is recorded on a holographic recording medium, if the holographic recording medium is illuminated with reference light, diffracted light is produced from a diffraction grating formed in the recording operation. The reproduced light includes data that was superimposed on the signal light during the recording process, and thus it is possible to reproduce the data by detecting the reproduced light using a photosensor.

In some holographic recording/reproducing apparatus, a solid laser or a gas laser is used as a laser light source. However, it is impossible to directly modulate such a type of laser. In such a type of holographic recording/reproducing apparatus, it is known to dispose an external modulator such as a mechanical shutter or an AOM (Acoustic Optic Modulator) in the outside of the laser light source whereby to modulate the laser light after the laser light is emitted from the laser light source. However, the use of the external modulator element makes it difficult to achieve a small-sized optical system and results in an increase in cost.

The above problems can be solved by using a laser diode as the laser light source of the holographic recording/reproducing apparatus. When a laser diode is used as the laser light source, it has been proposed to use an external cavity to enhance the coherence of the laser diode (refer to, for example, Japanese Unexamined Patent Application Publication No. 2001-284715, (in particular, paragraphs [0028] to [0031] and FIG. 1)). The use of the laser diode as the laser light source makes it possible to directly modulate the laser, and thus it becomes unnecessary to provide an external modulator for modulating a laser beam emerging from the laser light source.

In the known external-cavity laser, when the current supplied to the laser diode is continuously varied, the wavelength of the laser light abruptly changes (this change is called mode hopping). The mode hopping occurs at rather short intervals of the current supplied to the laser diode. If the current supplied to the laser diode is set to a value near a mode hopping point, the wavelength of laser light becomes unstable, and it becomes difficult to achieve high performance in recording/reproducing data on/from a holographic recording medium.

SUMMARY OF THE INVENTION

In view of the above, the present invention provides a method and apparatus for recording/reproducing a hologram using laser light with a stabilized wavelength emitted from a laser light source.

According to an embodiment of the present invention, there is provided a holographic recording/reproducing apparatus adapted to split laser light into signal light and reference light and to record a hologram by illuminating a holographic recording medium with the signal light and the reference light and/or to reproduce the hologram by illuminating the holographic recording medium with the reference light, the holographic recording/reproducing apparatus including a laser light source that emits the laser light, measuring means for measuring the wavelength of the laser light, and setting means for measuring the wavelength of the laser light while changing a current supplied to the laser light source, and for setting the current supplied to the laser light source based on a measurement result such that the influence of a change in the wavelength of the laser light is minimized.

In this holographic recording/reproducing apparatus, the laser light source may be an external cavity laser. Note that a change in the wavelength of the laser light emitted by the laser light source can occur when the current supplied to the laser light source changes. In particular, when the current supplied to the laser light source is increased in a particular range, hopping to a greater wavelength can occur. In the present embodiment of the invention, the current supplied to the laser light source is set to a value that is not in such a particular range, thereby minimizing the probability of the occurrence of mode hopping (hereinafter, such a particular range will be referred to as a mode hopping band). That is, in the present embodiment of the invention, the current supplied to the laser light source is set to a value outside a range in which mode hopping occurs, thereby preventing the laser light emitted from the laser light source from having a significant change in wavelength.

In the present embodiment of the invention, the wavelength of the laser light is measured while varying the current supplied to the laser light source to detect any mode hopping band, whether it is very narrow or not, and the current supplied to the laser light source is properly set according to the measurement result such that the current supplied to the laser light source is not in any mode hopping band. This ensures that the wavelength of the laser light emitted from the laser light source is maintained in a stable state.

The holographic recording/reproducing apparatus may further include blocking means for blocking the laser light when the setting means sets the current supplied to the laser light source such that the holographic recording medium is not illuminated with the laser light during the setting.

A mechanical shutter or a liquid crystal shutter may be used as the blocking means.

The provision of the blocking means makes it possible to prevent the holographic recording medium from being illuminated with laser light during the period in which the setting of the current is performed (and the wavelength of the laser light is unstable), thereby preventing noise from being recorded on the holographic storage medium.

The setting means may set the current supplied to the laser light source such that the setting means detects first and second current values, the first current value being a value at which the wavelength of the laser light abruptly changes when the current supplied to the laser light source is increased, and the second current value being a value at which the wavelength of the laser light abruptly changes when the current supplied to the laser light source is reduced, and the setting means sets the current supplied to the laser light source to a value substantially equal to the middle between the first and second current values.

By setting the current supplied to the laser light source to a value substantially equal to the middle of two adjacent mode hopping points, it is possible to minimize the influence of mode hopping.

The setting means may set the current supplied to the laser light source such that the setting means detects third and fourth current values, the third current value being a value at which the laser light has a maximum wavelength when the current supplied to the laser light source is increased, and the fourth current value being a value at which the laser light has a minimum wavelength when the current supplied to the laser light source is reduced. The setting means determines a range in which the first current value will not become greater than the third current value and the second current value will not become less than the fourth current value, and, thereafter, the setting means detects the first and second current values within the range and sets the current supplied to the laser light source.

In a range in which the wavelength of the laser light has a maximum value and a minimum value, the wavelength has an abrupt reduction when the current is increased. Such an abrupt reduction occurs in a mode hopping band in a laser chip mode. By setting the current supplied to the laser light source in the above-described manner according to the present embodiment of the invention, it is possible to prevent the current from being set in a mode hopping band in the laser chip mode.

The holographic recording/reproducing apparatus may further include temperature detecting means for detecting the temperature of the laser light source, and the setting means may reset the current supplied to the laser light source when the temperature detecting means detects a temperature change greater than a predetermined value.

Even if the current supplied to the laser light source is set to a value substantially equal to the middle of two adjacent mode hopping points, a temperature change can cause the current to deviate from the middle of the two adjacent mode hopping points. In an extreme case, the deviation can cause the current to be brought into a mode hopping band in the laser chip mode. In the present embodiment of the invention, to avoid the above problem, resetting of the current supplied to the laser light source is performed when a change in temperature greater than the predetermined value occurs, thereby ensuring that a significant change in the wavelength of the laser light emitted from the laser light source does not occur over a long term.

The setting means may also perform the operations of detecting the first and second current values and resetting the current supplied to the laser light source at predetermined intervals.

The current initially set at the middle of two mode hopping points can deviate from the exact middle point with time. To avoid the problem due to such a deviation, setting of the current supplied to the laser light source is performed repeatedly at predetermined intervals. This ensures that the wavelength of the laser light emitted from the laser light source is maintained in a stable state over a long term.

The setting means may reset the current supplied to the laser light source when a change greater than a predetermined value is detected in the wavelength measured by the measuring means.

That is, in the present embodiment of the invention, resetting of the current supplied to the laser light source may be performed when a change in the wavelength greater than the predetermined value occurs, thereby ensuring that the wavelength of the laser light emitted from the laser light source is maintained in a stable state over a long term.

The setting means may reset the current supplied to the laser light source at predetermined intervals.

That is, in the present embodiment of the invention, resetting of the current supplied to the laser light source may be performed repeatedly at predetermined intervals, thereby ensuring that a significant change in the wavelength of the laser light emitted from the laser light source does not occur over a long term.

According to another embodiment of the present invention, there is provided a method of recording and/or reproducing a hologram by splitting laser light into signal light and reference light and recording a hologram by illuminating a holographic recording medium with the signal light and the reference light and/or reproducing the hologram by illuminating the holographic recording medium with the reference light. The method includes emitting the laser light from a laser light source, measuring the wavelength of the laser light while changing a current supplied to the laser light source, and setting the current supplied to the laser light source based on a measurement result such that the influence of a change in the wavelength of the laser light is minimized.

That is, in the present embodiment of the invention, the current supplied to the laser light source is set to a value outside a range in which mode hopping occurs, thereby preventing the laser light emitted from the laser light source from having a significant change in wavelength. Because the current supplied to the laser light source is properly set according to the measurement result such that the current supplied to the laser light source is not in any mode hopping band, it is possible to achieve high stability in the wavelength of the laser light emitted from the laser light source.

In this method of recording and/or reproducing a hologram according to the present embodiment of the invention, the laser light may be blocked when the wavelength of the laser light is measured or when the current supplied to the laser light source is set so that the holographic recording medium is not illuminated with the laser light during the measurement or the setting, thereby preventing noise from being recorded on the holographic storage medium.

The steps of measuring the wavelength of the laser light and setting the current supplied to the laser light source may include detecting a first current value at which the wavelength of the laser light abruptly changes when the current supplied to the laser light source is increased, detecting a second current value at which the wavelength of the laser light abruptly changes when the current supplied to the laser light source is reduced, and setting the current supplied to the laser light source to a value substantially equal to the middle between the first and second current values. This makes it possible to minimize the influence of mode hopping.

The steps of measuring the wavelength of the laser light and setting the current supplied to the laser light source may include detecting a third current value at which the laser light has a maximum wavelength when the current supplied to the laser light source is increased, detecting a fourth current value at which the laser light has a minimum wavelength when the current supplied to the laser light source is reduced, determining a range in which the first current value will not become greater than the third current value and the second current value will not become less than the fourth current value, and detecting the first and second current values within the range and setting the current supplied to the laser light source.

By setting the current supplied to the laser light source in the above-described manner according to the present embodiment of the invention, it is possible to prevent the current from being set in a mode hopping band in the laser chip mode.

In the measurement of the wavelength of the laser light and the setting of the current supplied to the laser light source, the current supplied to the laser light source may be reset when a change greater than a predetermined value is detected in the temperature of the laser light source, thereby achieving high stability of the wavelength of the laser light emitted by the laser light source.

In the measurement of the wavelength of the laser light and the setting of the current supplied to the laser light source, the operations of detecting the first and second current values and setting the current supplied to the laser light source may be performed at predetermined intervals. This ensures that the wavelength of the laser light emitted from the laser light source is maintained in a stable state over a long term.

In the measurement of the wavelength of the laser light and the setting of the current supplied to the laser light source, the current supplied to the laser light source may be reset when a change greater than a predetermined value is detected in the measured wavelength. This ensures that the wavelength of the laser light emitted from the laser light source is maintained in a stable state over a long term.

In the measurement of the wavelength of the laser light and the setting of the current supplied to the laser light source, the current supplied to the laser light source may be reset at predetermined intervals. This makes it possible to achieve high stability of the wavelength of the laser light emitted by the laser light source.

In embodiments of the invention, as described above, the current supplied to the laser light source is set to a value outside a range in which mode hopping occurs, thereby preventing the laser light emitted from the laser light source from having a significant change in wavelength. More specifically, mode hopping bands are detected by measuring the wavelength of laser light while changing the current supplied to the laser light source, and the current supplied to the laser light source is set to a value that is not included in any mode hopping band, thereby ensuring that the wavelength of the laser light emitted from the laser light source is maintained in a stable state.

DETAILED DESCRIPTION

The present invention is described in further detail below with reference to embodiments in conjunction with the accompanying drawings.

Structure of Holographic Recording Apparatus

Figure 1:
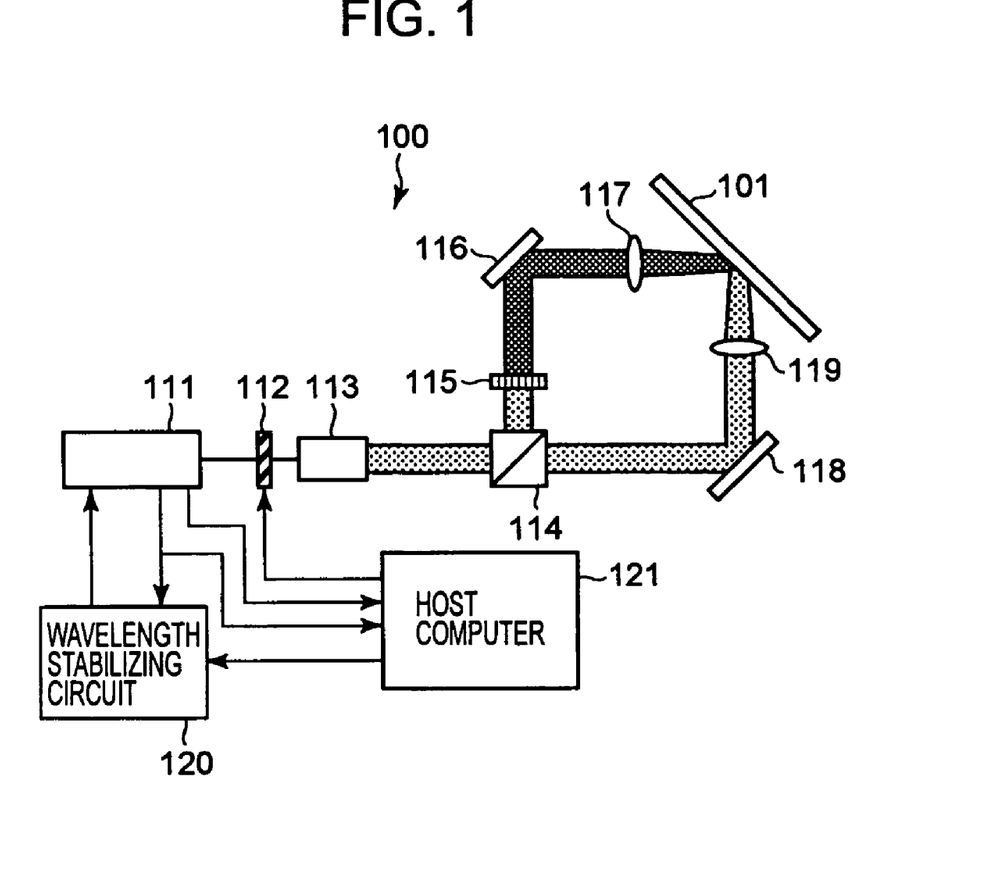
FIG. 1 is a schematic diagram showing a holographic recording apparatus according to an embodiment of the present invention.

FIG. 1 is a schematic diagram showing a holographic recording apparatus according to an embodiment of the present invention.

As shown in FIG. 1, the holographic recording apparatus 100 is an apparatus adapted to record a hologram on a holographic recording medium 101. Although in the present example shown in FIG. 1, the holographic recording apparatus 100 includes only a recording system, the apparatus may also include a reproduction system.

The holographic recording apparatus 100 includes a laser light source 111, a shutter 112, a beam expander 113, a beam splitter 114, a spatial light modulator 115, a mirror 116, a signal light objective lens 117, a mirror 118, a reference light objective lens 119, a wavelength stabilizing circuit 120, and a host computer 121.

Although not shown in the figure, the holographic recording medium 101 includes a recording layer and a protective layer for protecting the recording layer from an environment, and the holographic recording medium 101 serves as a recording medium for recording an interference pattern produced by interference between signal light and reference light.

The recording layer is a layer in which to record an interference pattern as a change in refractive index (or transmittance). As a material for the recording layer, any organic or inorganic material may be used as long as the refractive index (or the transmittance) of the material changes depending on the intensity of light.

An example of an inorganic material for this purpose is a photorefractive material such as lithium niobate ($LiNbO_3$) whose refractive index changes by an electro-optic effect depending on the intensity of light striking the material. An example of an organic material is a photopolymerizing material. In an initial state of a photopolymerizing material, a monomer is uniformly dispersed in a matrix polymer. If the photopolymerizing material is exposed to light, a part of the monomer exposed to light polymerizes.

The nature the recording layer that the refractive index (or the transmittance) thereof changes depending on the intensity of incident light makes it possible record an interference pattern produces a result of interference between signal light and reference light as a change in refractive index (or transmittance) on the holographic recording medium 101.

By moving the holographic recording medium 101 using driving means (not shown) in a case in which the holographic recording medium 101 is in the form of a card or by rotating the holographic recording medium 101 when the holographic recording medium 101 is in the form of a disk, it is possible to record an image output from the spatial light modulator 115 as a large number of holograms. As a result of movement of the holographic recording medium 101, the recording or reproducing of holograms is performed along a track formed in the same direction as the direction in which the holographic recording medium 101 is moved.

It is desirable that the holographic recording medium 101 have a layer with grooves used in a servo control operation associated with tracking and/or focusing.

The holographic recording medium 101 may include a reflective layer such that the holographic recording medium 101 works as a reflective-type recording medium.

Figure 2:
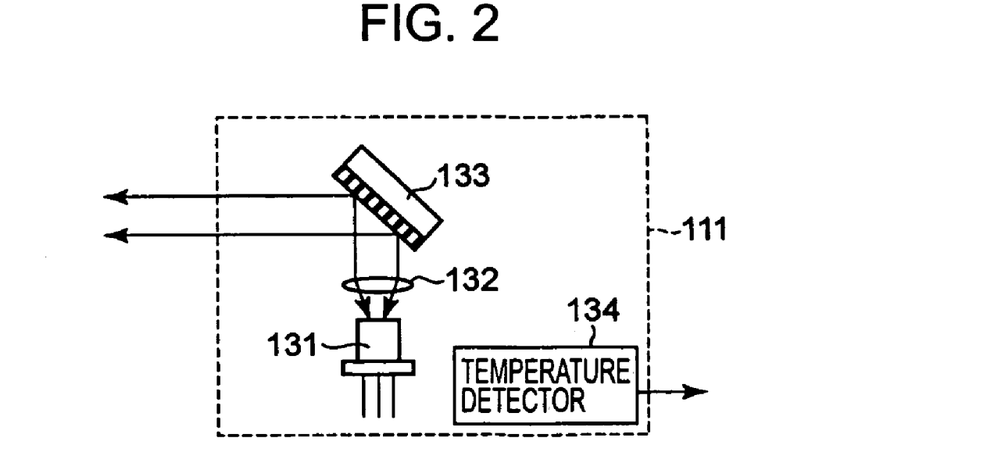
FIG. 2 is a schematic diagram showing a laser light source in the holographic recording apparatus shown in FIG. 1.

The laser light source 111 serves to emit laser light and includes, as shown in FIG. 2, a laser diode 131, a collimating lens 132, a diffraction grating 133, and a temperature detector 134.

The laser diode 131 emits multi-mode laser light with a wavelength of, for example, about 410 nm (blue laser light). The collimating lens 132 collimates the laser light emitted by the laser diode 131. The diffraction grating 132 produces first-order light in different directions depending on the wavelength. The angle of the diffraction grating 132 with respect to the laser diode 131 is set such that, of components of the first-order light with various wavelengths, only a component with a particular wavelength (for example, 410 nm) is returned back to the laser diode 131 so that only the light component with this wavelength is amplified in the laser diode 131 and thus the laser diode 131 operates as a single-mode laser diode. A majority of the laser light emitted by the laser diode 131 is not first-order light but 0th-order light. The 0th-order light is reflected by the diffraction grating 133, that is, the diffraction grating 133 works as a mirror for the 0th-order light. That is, the laser light source 111 basically operates as a Littrow external cavity laser. The temperature detector 134 detects the temperature of the laser diode 131, and sends data indicating the detected temperature to the host computer 121. For example, a thermister or a semiconductor temperature sensor may be used as the temperature detector 134.

The shutter 112 is realized, for example, using a liquid device and opens and closes under the control of the host computer 121. More specifically, when the shutter 112 is opened when a hologram is recorded on the holographic recording medium 101, but it is closed when the current of the laser diode 131 is set. The process of setting the current of the laser diode 131 will be explained later.

The beam expander 113 is an optical device that expands the beam diameter of the laser beam emitted from the laser light source 111 into a diameter sufficiently large for the spatial light modulator 115 to modulate the laser beam.

The beam splitter 114 is an optical device that splits collimated light, which is emitted by the laser light source 111 and is incident on the beam splitter 114 via the shutter 112, into signal light and reference light.

The spatial light modulator 115 is an optical device that spatially (two-dimensionally in the present embodiment) modulates the signal light such that data is superimposed. The spatial light modulator 115 may be realized using a transmissive liquid crystal device. Note that the spatial light modulator may also be realized using a reflective device such as a DMD (Digital Micromirror Device), a reflective liquid crystal device, or a GLV (Grating Light Valve). The spatial light modulator 115 needs to have a high response characteristic. For example, it is desirable that the response time of the spatial light modulator 115 be less than 1 msec. The spatial light modulator 115 operates under the control of the host computer 121.

The mirrors 116 and 117 are optical devices that change optical paths of laser beams incident on the respective mirrors 116 and 117 to particular directions.

The signal light objective lens 117 and the reference light objective lens 119 are optical devices that respectively focus the signal light and the reference light on the holographic recording medium 101.

Figure 3:
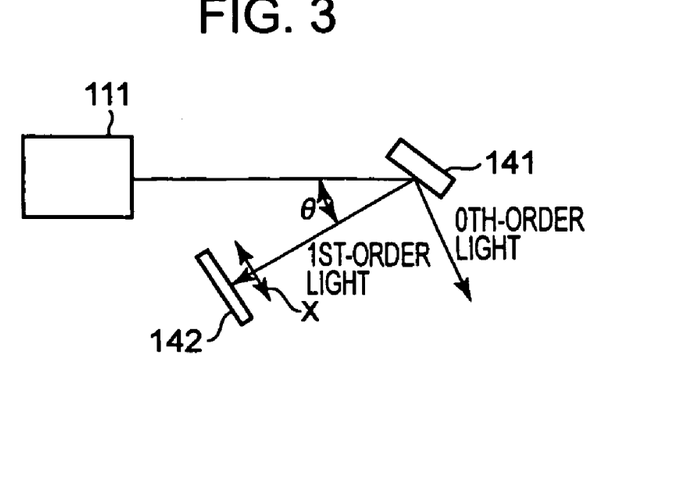
FIG. 3 is a diagram showing a method of detecting the wavelength of laser light emitted by a laser light source.

Although not shown in FIG. 1, the holographic recording apparatus 100 according to the present embodiment includes a wavelength detector, disposed between the holographic recording apparatus 111 and the shutter 112, for detecting the wavelength of the laser light emitted by the laser light source 111. FIG. 3 shows an example of the wavelength detector.

The laser light emitted by the laser light source 111 is diffractively reflected by a grating 141. As a result, the laser light is split into 0th-order light and first-order light. The diffraction angle of the first-order light varies depending on the wavelength of the incident laser light, and thus the spot on the detector 142 struck by the first-order light moves in a direction denoted by an arrow X.

Figure 4:
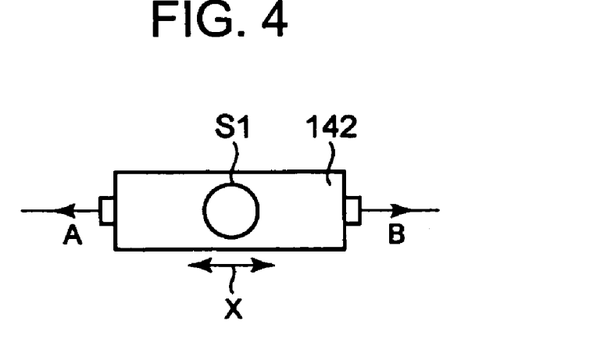
FIG. 4 is a schematic diagram showing a position detector used in the method shown in FIG. 3.

Therefore, the change in the wavelength can be detected by detecting the position of the spot on the detector 142 struck by the laser light. Thus, as shown in FIG. 4, a position sensitive detector (PSD) can be used as the detector 142. The PSD consists of one element, and the laser spot S1 incident on the photosensor of the position sensitive detector moves in a direction denoted by X in FIG. 4 with changing wavelength.

The result of the detection of the photocurrents A and B is sent from the PSD to the host computer 121. The change in the wavelength of the laser light is determined from photocurrents A and B in accordance with the following equation.

Change in wavelength=$(A-B)/(A+B)$

Note that the 0th-order light shown in FIG. 3 is not influenced by the change in the wavelength, and is used to record a hologram.

Figure 5:
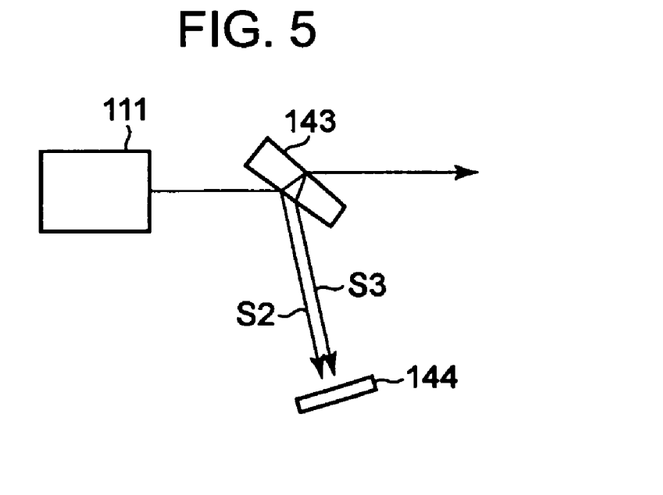
FIG. 5 is a diagram showing another method of detecting the wavelength of laser light emitted by a laser light source.

FIG. 5 shows another example of the wavelength detector. In this example, laser light emitted by the laser light source 111 is incident on an optical wedge 143 whose thickness slightly varies in its longitudinal direction, and laser light S2 reflected from the surface of the optical wedge 143 and laser light S3 reflected from the back surface of the optical wedge 143 are incident on a photodetector 144.

Figure 6:
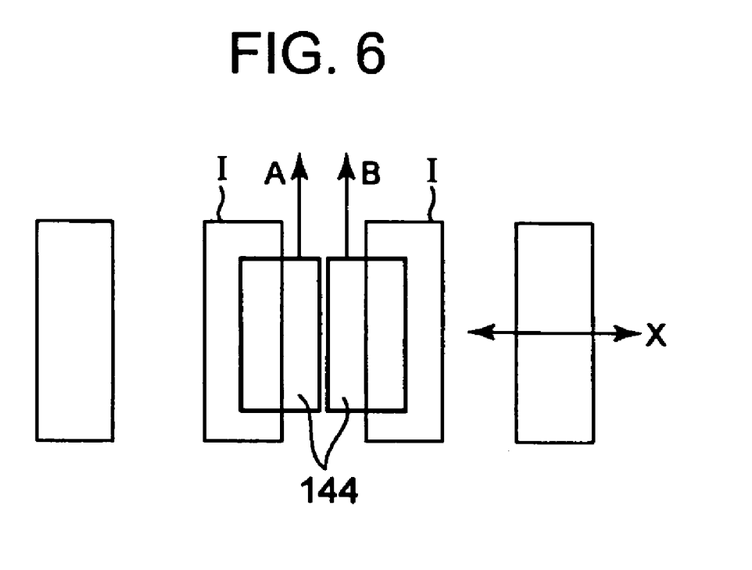
FIG. 6 is a schematic diagram showing the details of a photodetector shown in FIG. 5.

As shown in FIG. 6, the laser light S2 and the laser S3 interferes with each other on the photodetector 144, and an interference pattern I appears as a result of the interference. The interference pattern I includes a plurality of fringes. The photodetector 144 include two parts, and the width of each part and the space between the two parts are set such that, of the plurality of interference fringes, two fringes appear on respective two parts of the photodetector 144.

If a change occurs in the wavelength of laser light emitted by the laser light source 111, the optical wedge 143 causes the interference pattern I to move on the photodetector 144 in the direction denoted by the arrow X. Data indicating the output currents A and B detected by the photodetector 144 is sent to the host computer 121. The change in the wavelength of the laser light can be determined from the output currents A and B according to the following equation.

Change in wavelength=$(A-B)/(A+B)$

Recording of a hologram is performed by laser light passing through the optical wedge 143.

Operation of Holographic Recording Apparatus

In the present embodiment of the invention, the holographic recording apparatus operates in a recording mode and a current setting mode in which the current supplied to the laser light source (hereinafter, referred to simply as the current setting mode).

Figure 7:
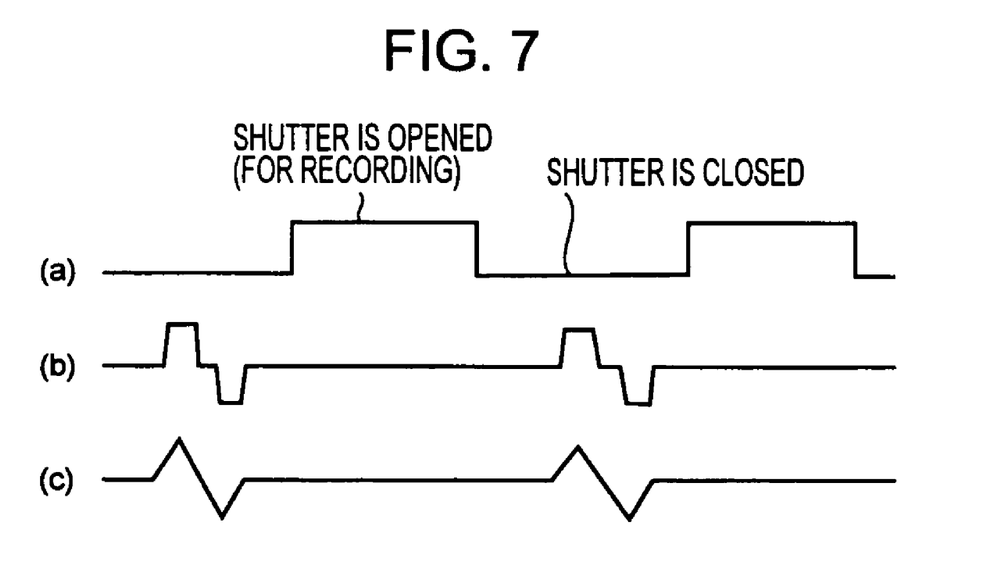
FIG. 7 is a diagram showing an operation of a shutter shown in FIG. 1.

As represented by a state diagram (a) shown in FIG. 7, the shutter 112 is opened by the host computer 121 in the recording mode, while the shutter 112 is closed by the host computer 121 in the current setting mode. In FIG. 7, a waveform (c) represents a laser current passing through the laser diode 131, and a waveform (b) represents a change in the wavelength corresponding to the laser current.

Operation in the Recording Mode

The laser light emitted from the laser light source 111 is passed through the shutter 112 and then the beam diameter of the laser light is expanded by the beam expander 113.

After the beam diameter is expanded, the resultant laser light is split by the beam splitter 114 into signal light and reference light.

The intensity of the signal light is then spatially modulated by the spatial light modulator 115. After the laser light is modulated by the spatial light modulator 115, the laser light is reflected by the mirror 116 and is incident on the holographic recording medium 101 via the signal light objective lens 117.

On the other hand, the reference light is reflected by the mirror 118, and is incident on the holographic recording medium 101 via the reference light objective lens 119.

An interference pattern is formed on the holographic recording medium 101 by focusing the signal light and the reference light on substantially the same position on the holographic recording medium 101 via the signal light objective lens 117 and the reference light objective lens 119. As a result, information spatially modulated by the spatial light modulator 115 is recorded as a hologram on the holographic recording medium 101.

Operation in the Current Setting Mode

In the external cavity laser using the laser diode 131 as the laser light source 111, a change in the current (laser current) supplied to the laser diode 131 causes a change in the oscillation wavelength of the laser light emitted by the laser diode 131. This produces wavelength bands that are unsuitable for use in recording or reproducing of a hologram, as described earlier. A change in temperature also causes a change in the oscillation wavelength.

Figure 8:
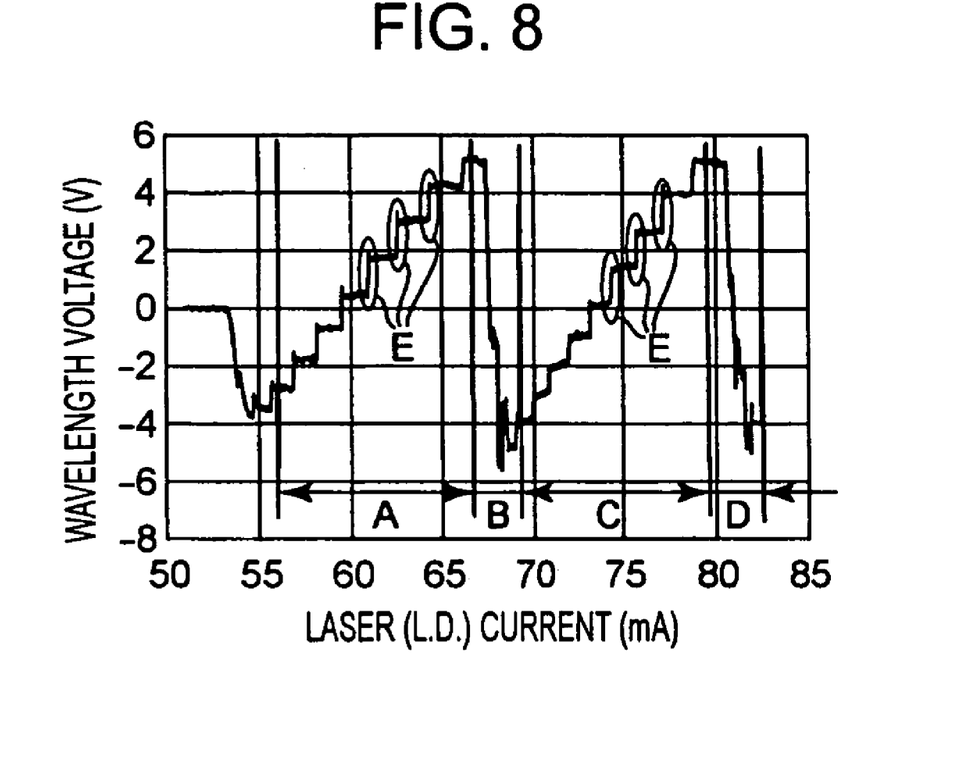
FIG. 8 is a graph showing an example of the dependence of a current on a change in wavelength.

FIG. 8 is a graph showing an example of the dependence of a laser current on a change in wavelength. In this specific example shown in FIG. 8, when the laser current is increased within a band A or C, the wavelength abruptly increases at many points E, that is, mode hopping occurs at many points E. In a band B or D in which the wavelength of the laser light has a maximum and a minimum value, a very great reduction in wavelength occurs when the laser current is increased.

Figure 9:
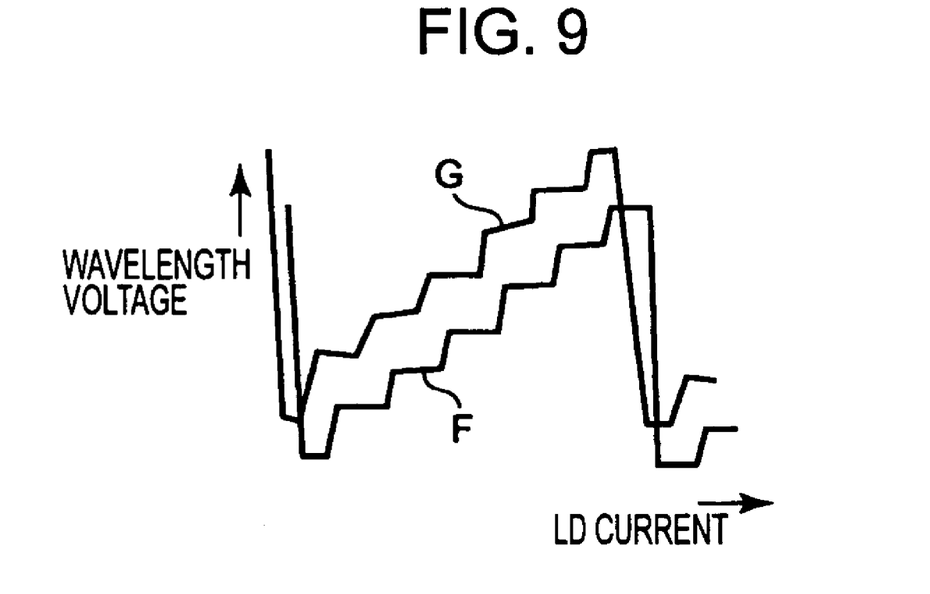
FIG. 9 is a graph showing an example of a change in wavelength caused by a temperature change.

FIG. 9 is a graph showing a manner in which a temperature change causes a change in the oscillation wavelength. In the example shown in FIG. 9, a temperature change causes a change in a wavelength characteristic from a curve F to G.

In the current setting mode, the laser current passed through the laser light source is set such that the laser current does not fall in any band in which the wavelength abruptly changes.

Figure 10:
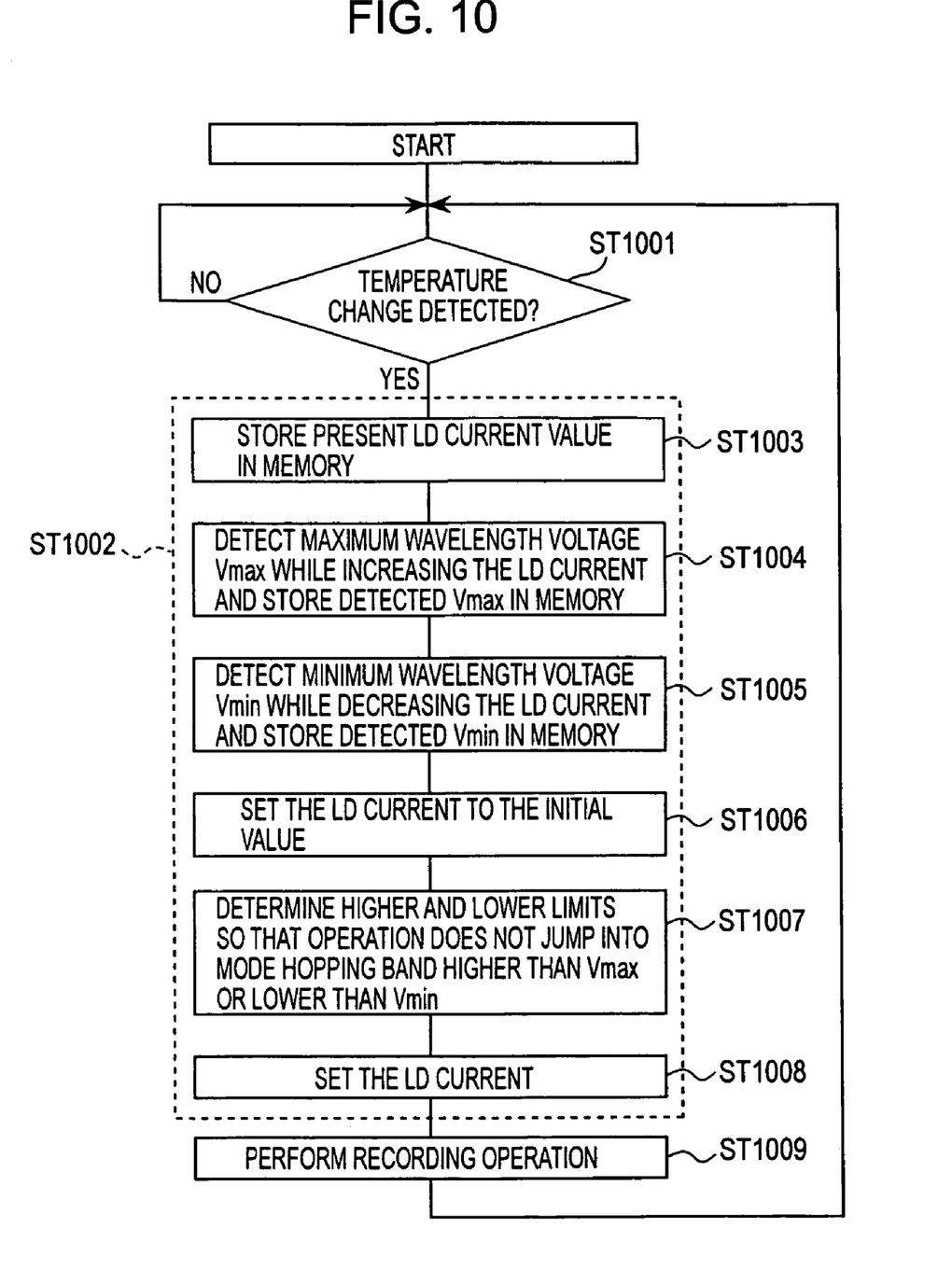
FIG. 10 is a flow chart showing an operation in a current setting mode in which the current supplied to a laser light source is set.

Now, referring to a flow chart shown in FIG. 10, the operation in the current setting mode is described in further detail below.

Data indicating the temperature of the laser light source 111 detected by the temperature detector 134 is sent to the host computer 121.

If the host computer 121 determines, based on the data received from the temperature detector 134, that a change in the temperature of the laser diode 131 greater than a predetermined threshold value has occurred, then the host computer 121 issues a control command to the wavelength stabilizing circuit 120. On receiving the control command, the wavelength stabilizing circuit 120 switches the operation mode into the current setting mode (step 1001).

Figure 11:
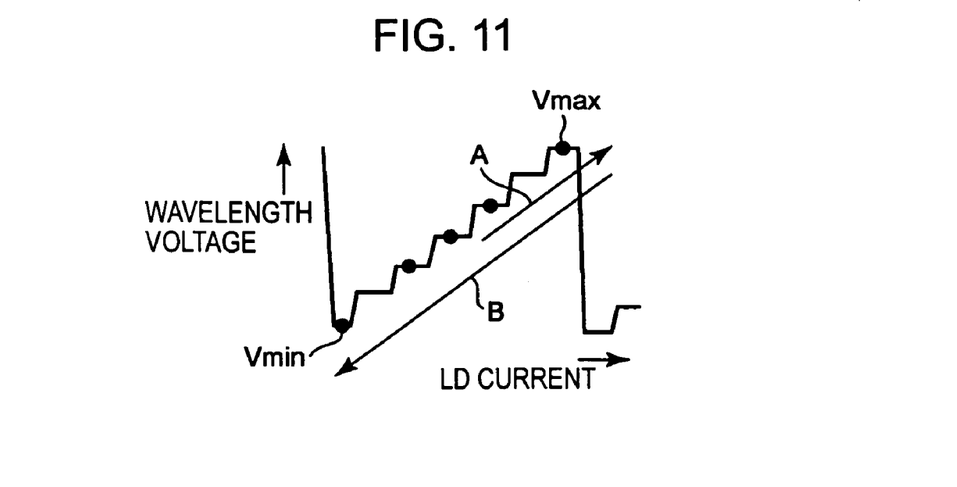
FIG. 11 is a diagram showing a manner of determining upper and lower limits of the current supplied to a laser light source to prevent laser light from having hopping of wavelength in a laser chip mode.

When the operation mode is switched into the current setting mode, the wavelength stabilizing circuit 120 starts a process in step 1002 shown in FIG. 10, as described below. First, the present value of the laser current supplied to the laser diode 131 is stored in a memory (step 1003). Thereafter, the laser current is gradually increased as represented by an arrow A in FIG. 11 until a maximum value Vmax of the wavelength voltage is obtained, and the detected maximum value Vmax is stored (step 1004). Subsequently, the laser current is gradually decreased as represented by an arrow B in FIG. 11 until a minimum value Vmin of the wavelength voltage is detected, and the detected minimum value Vmin is stored (step 1005). The laser current is set to the initial value (step 1006). Based on the maximum value Vmax and the minimum value Vmin of the wavelength voltage detected in the above-described measurement process, upper and lower limits of the range of the laser current are determined so that the laser does not encounter mode hopping in the laser chip mode as long as the laser current is within this range (step 1007). The details of the laser current vs. wavelength voltage characteristic are shown in an enlarged form in FIG. 12, in which the wavelength voltage corresponding to the present laser current is denoted by P. In step 1008, the laser current is increased from point P as represented by an arrow A in FIG. 12, and a voltage V1, at which an abrupt change in the wavelength occurs, is detected. The value of the laser current corresponding to the voltage V1 is denoted as LD1.

Figure 12:
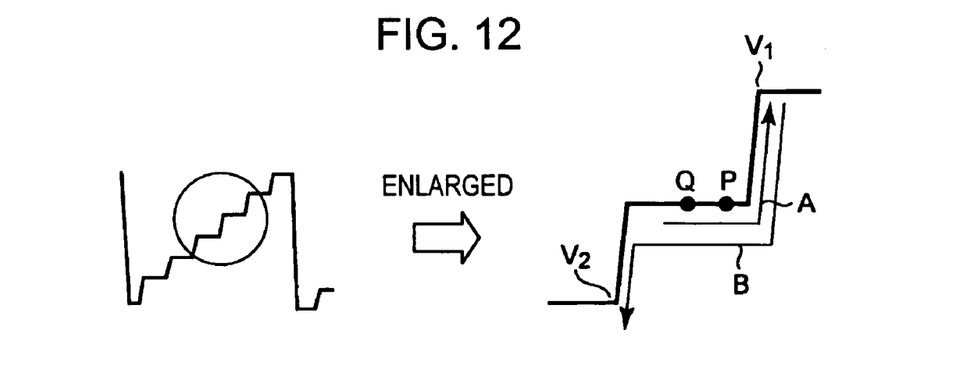
FIG. 12 is a diagram showing a manner of setting the current supplied to a laser light source such that no mode hopping occurs.

After the voltage V1 is detected, the laser current is decreased as represented by an arrow B in FIG. 12, and a voltage V2, at which an abrupt reduction in the wavelength occurs, is detected. The value of the laser current corresponding to the voltage V2 is denoted as LD2.

The current supplied to the laser diode 131 is then set to a value equal to (LD1+LD2)/2. As a result, the laser current in set at a point denoted by Q in FIG. 12, that is, the laser current is set to a value substantially equal to the middle between two adjacent mode hopping points at which an abrupt change in the wavelength occurs.

Figure 13:
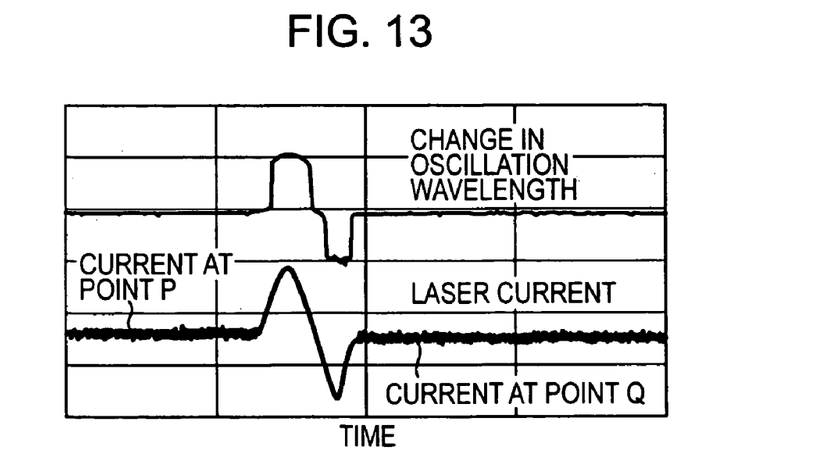
FIG. 13 is a graph showing a measured change in wavelength and a laser current in an operation condition shown in FIG. 12.

FIG. 13 shows the wavelength and the laser current varying as a function of the time in the above-described process. After the laser current is set in the above-described manner, the operation in the recording mode is performed (step 1009).

In the present embodiment of the invention, as described above, the laser current is set such that the laser current is in a range that is not included in any mode hopping band in the laser chip mode and such that the laser current is set at the substantially middle point between two adjacent mode hopping points at which an abrupt change in the wavelength occurs. After the laser current is set in such a manner, the operation in the recording mode is performed. The operation in the current setting mode is performed again when a temperature change greater than the predetermined threshold value is detected. Thus, the wavelength of the laser light emitted from the laser light source 111 is stabilized.

OTHER EMBODIMENTS

Figure 14:
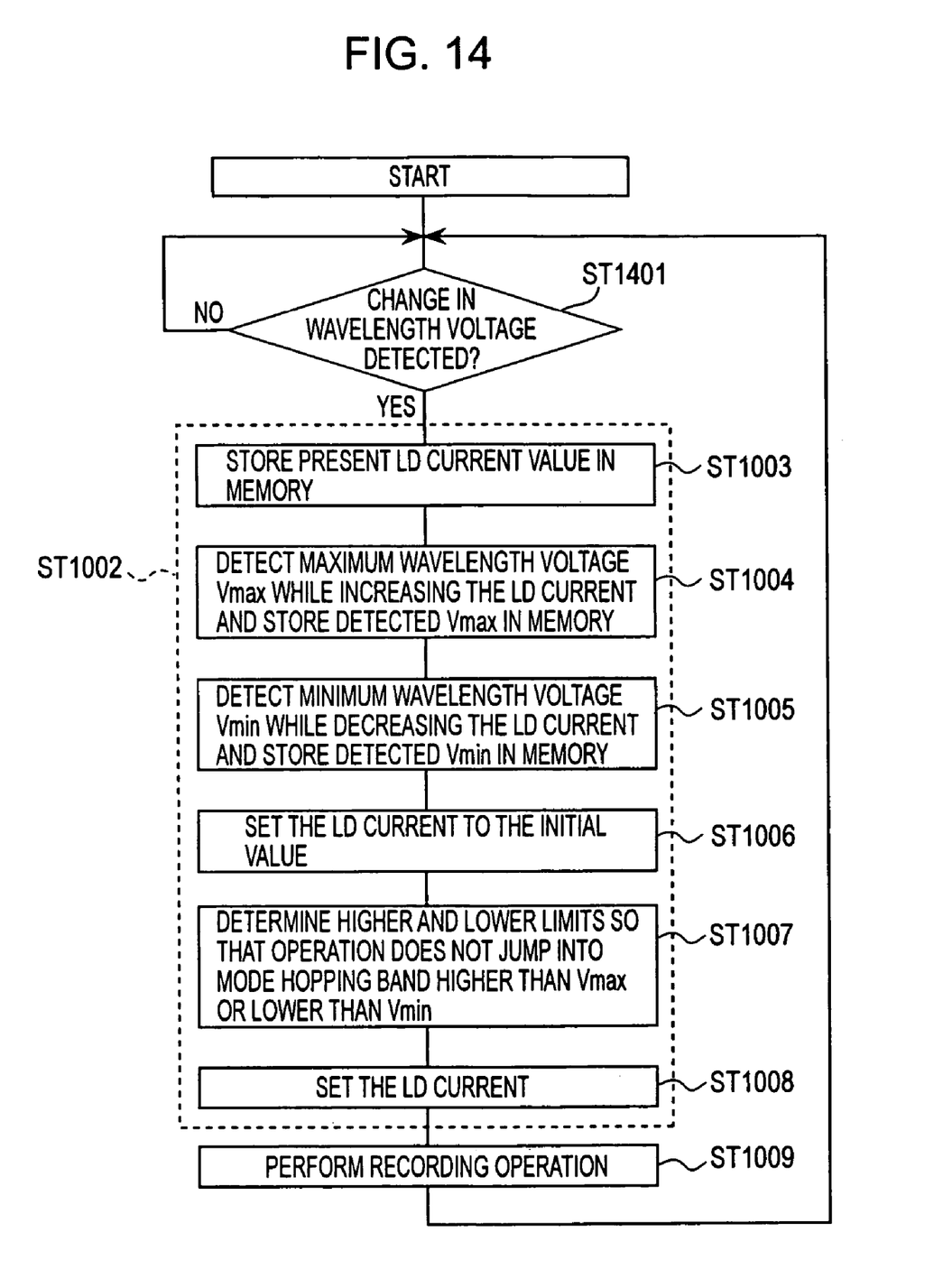
FIG. 14 is a flow chart showing another example of an operation in a current setting mode in which the current supplied to a laser light source is set.
Figure 15:
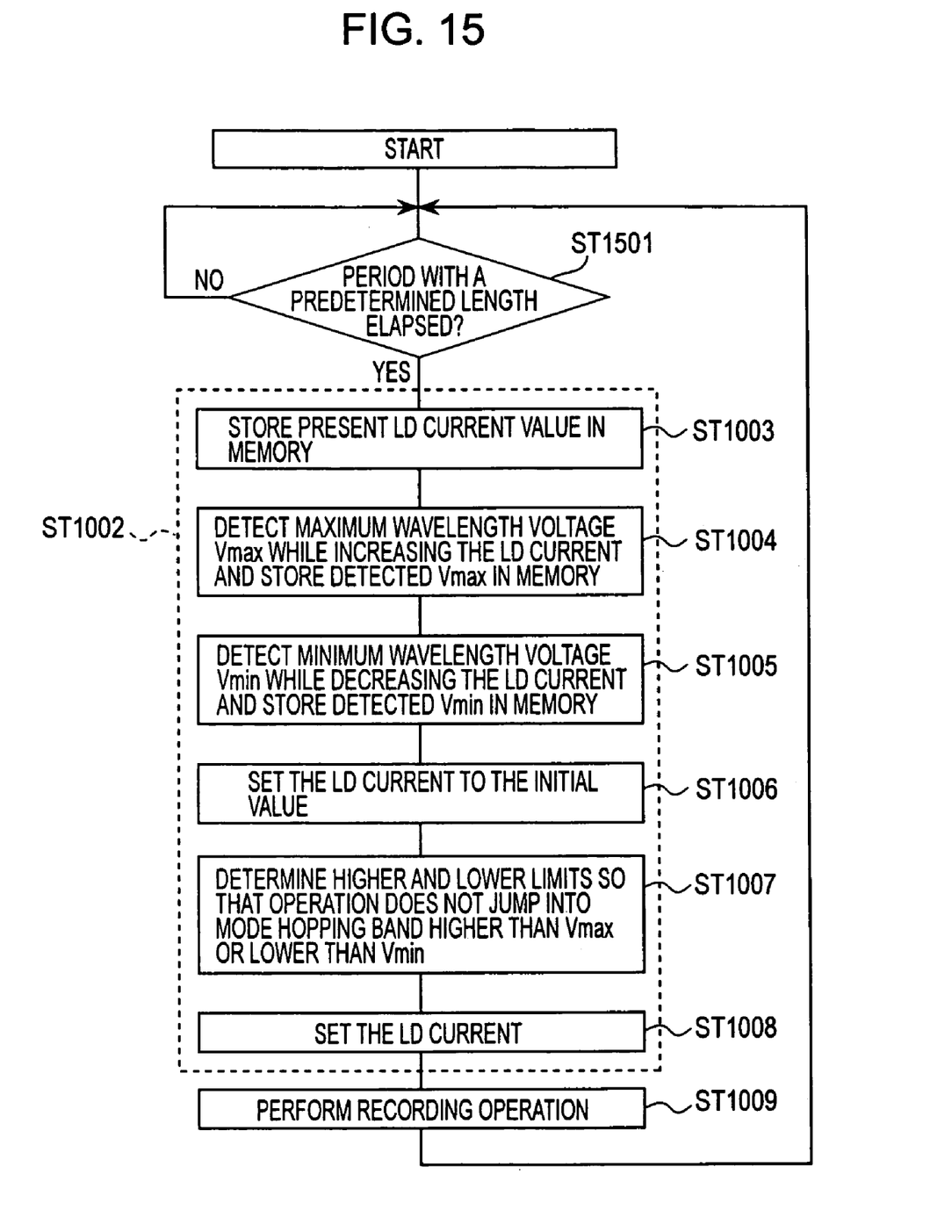
FIG. 15 is a flow chart showing another example of an operation in a current setting mode in which the current supplied to a laser light source is set.
Figure 16:
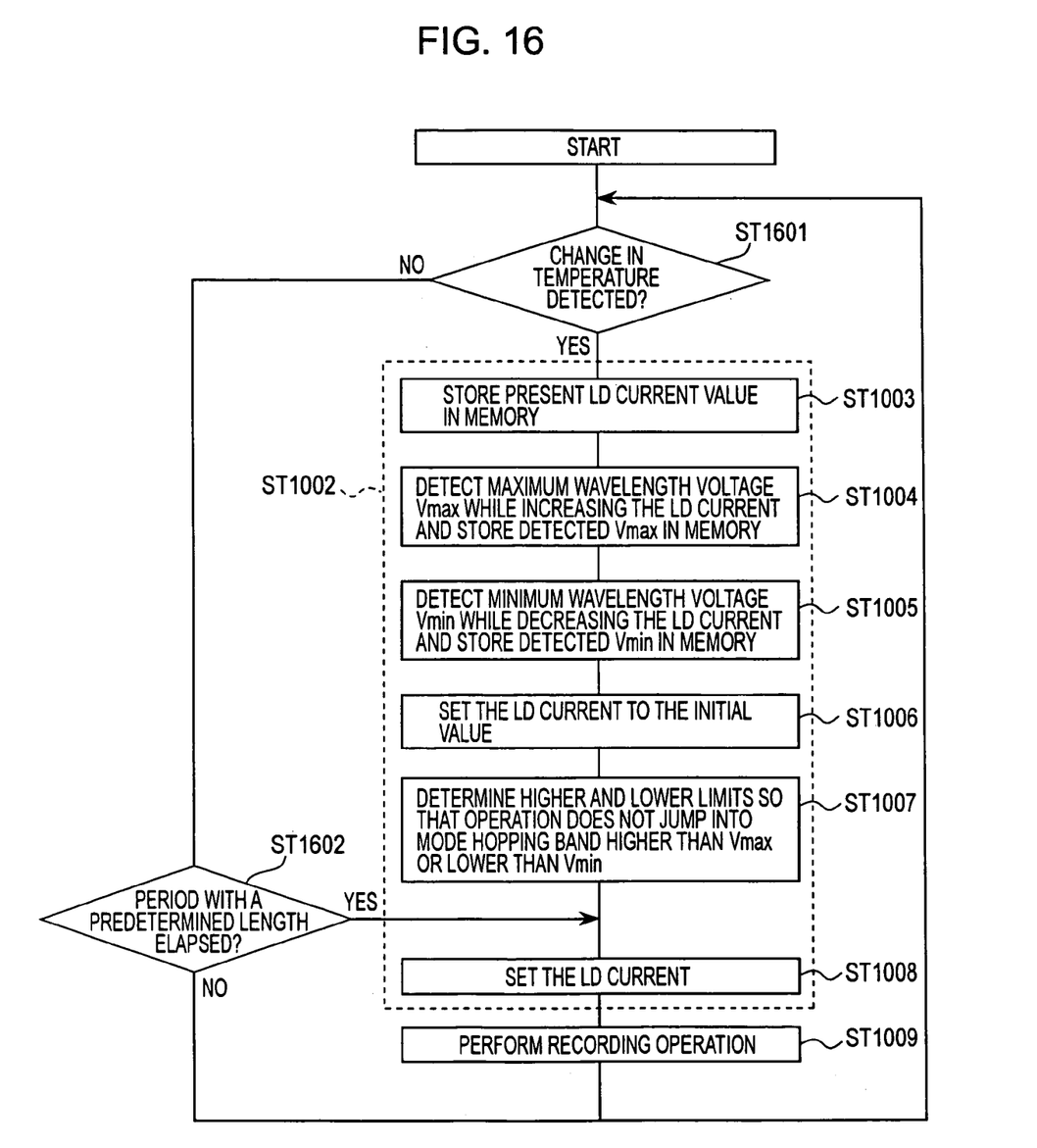
FIG. 16 is a flow chart showing another example of an operation in a current setting mode in which the current supplied to a laser light source is set.

In the embodiment described above, the operation in the current setting mode is performed when a temperature change greater than the threshold value occurs. However, the timing of performing the operation in the current setting mode is not limited to that employed in the above-described embodiments, but the operation in the current setting mode may be performed in response to an occurrence of other events as shown in FIGS. 14 to 16. In the example shown in FIG. 14, when a wavelength detector 142 serving as wavelength detection means detects a change in the wavelength, that is, a change in the wavelength voltage (step 1401), the operation in the current setting mode is performed.

In the example shown in FIG. 15, each time a period of time with a predetermined length has elapsed (step 1501), the operation in the current setting mode is performed.

In the example shown in FIG. 16, when a change in temperature is detected (step 1601), or when a period of time with a predetermined length has elapsed (step 1602), the operation in the current setting mode is performed in step 1009.

The operation in the current setting mode may also be performed in response to any combination of events.

Although in the embodiments described above, the invention is applied to a holographic recording apparatus by way of example, the invention may also be applied to a holographic reproducing apparatus or an apparatus capable of performing both recording and reproducing of a hologram.

It should be understood by those skilled in the art that various modifications, combinations, sub-combinations and alterations may occur depending on design requirements and other factors insofar as they are within the scope of the appended claims or the equivalents thereof.

The invention claimed is:

1. A holographic recording/reproducing apparatus adapted to split laser light into signal light and reference light and to record a hologram by illuminating a holographic recording medium with the signal light and the reference light and/or to reproduce the hologram by illuminating the holographic recording medium with the reference light, the holographic recording/reproducing apparatus comprising:

a laser light source that emits the laser light;

measuring means for measuring the wavelength of the laser light; and setting means for measuring the wavelength of the laser light while changing a current supplied to the laser light source, and for setting the current supplied to the laser light source based on a measurement result such that the influence of a change in the wavelength of the laser light is minimized, wherein the setting means sets the current supplied to the laser light source such that the setting means detects first and second current values, the first current value being a value at which the wavelength of the laser light abruptly changes when the current supplied to the laser light source is increased, and the second current value being a value at which the wavelength of the laser light abruptly changes when the current supplied to the laser light source is reduced, the setting means sets the current supplied to the laser light source to a value substantially equal to the middle between the first and second current values, and the setting means sets the current supplied to the laser light source such that the setting means detects third and fourth current values, the third current value being a value at which the laser light has a maximum wavelength when the current supplied to the laser light source is increased, and the fourth current value being a value at which the laser light has a minimum wavelength when the current supplied to the laser light source is reduced, the setting means determines a range in which the first current value will not become greater than the third current value and the second current value will not become less than the fourth current value, and the setting means detects the first and second current values within the range and sets the current supplied to the laser light source.

2. The holographic recording/reproducing apparatus according to claim 1, further comprising temperature detecting means for detecting the temperature of the laser light source, wherein the setting means resets the current supplied to the laser light source when the temperature detecting means detects a temperature change greater than a predetermined value.

3. The holographic recording/reproducing apparatus according to claim 2, wherein the setting means performs the operations of detecting the first and second current values and resetting the current supplied to the laser light source at predetermined intervals.

4. The holographic recording/reproducing apparatus according to claim 1, wherein the setting means resets the current supplied to the laser light source when a change greater than a predetermined value is detected in the wavelength measured by the measuring means.

5. The holographic recording/reproducing apparatus according to claim 1, wherein the setting means resets the current supplied to the laser light source at predetermined intervals.

6. A method of recording and/or reproducing a hologram by splitting laser light into signal light and reference light and recording a hologram by illuminating a holographic recording medium with the signal light and the reference light and/or reproducing the hologram by illuminating the holographic recording medium with the reference light, the method comprising:

emitting the laser light from a laser light source;

measuring the wavelength of the laser light while changing a current supplied to the laser light source; and setting the current supplied to the laser light source based on a measurement result such that the influence of a change in the wavelength of the laser light is minimized, wherein the steps of measuring the wavelength of the laser light and setting the current supplied to the laser light source include detecting a first current value at which the wavelength of the laser light abruptly changes when the current supplied to the laser light source is increased, detecting a second current value at which the wavelength of the laser light abruptly changes when the current supplied to the laser light source is reduced, and setting the current supplied to the laser light source to a value substantially equal to the middle between the first and second current values, and the steps of measuring the wavelength of the laser light and setting the current supplied to the laser light source include detecting a third current value at which the laser light has a maximum wavelength when the current supplied to the laser light source is increased, detecting a fourth current value at which the laser light has a minimum wavelength when the current supplied to the laser light source is reduced, determining a range in which the first current value will not become greater than the third current value and the second current value will not become less than the fourth current value, and detecting the first and second current values within the range and setting the current supplied to the laser light source.

7. The method of recording and/or reproducing a hologram according to claim 6, further comprising detecting the temperature of the laser light source, wherein the steps of measuring the wavelength of the laser light and setting the current supplied to the laser light source include resetting the current supplied to the laser light source when a change greater than a predetermined value is detected in the temperature of the laser light source.

8. The method of recording and/or reproducing a hologram according to claim 6, wherein the steps of measuring the wavelength of the laser light and setting the current supplied to the laser light source include detecting the first and second current values and setting the current supplied to the laser light source at predetermined intervals.

9. The method of recording and/or reproducing a hologram according to claim 6, wherein the steps of measuring the wavelength of the laser light and setting the current supplied to the laser light source include resetting the current supplied to the laser light source when a change greater than a predetermined value is detected in the measured wavelength.

10. The method of recording and/or reproducing a hologram according to claim 6, wherein the steps of measuring the wavelength of the laser light and setting the current supplied to the laser light source include resetting the current supplied to the laser light source at predetermined intervals.

* * * * *